(12) United States Patent
Goossens et al.

(10) Patent No.: US 7,195,027 B2
(45) Date of Patent: Mar. 27, 2007

(54) SOLENOID VALVE

(75) Inventors: Andre F. L. Goossens, Rumst (BE); Luc van Himme, Zaffelare (BE)

(73) Assignee: Continental Teves AG & Co. oHG, Frankfurt (DE)

( * ) Notice: Subject to any disclaimer, the term of this patent is extended or adjusted under 35 U.S.C. 154(b) by 91 days.

(21) Appl. No.: 10/511,817

(22) PCT Filed: Apr. 28, 2003

(86) PCT No.: PCT/EP03/04422

§ 371 (c)(1), (2), (4) Date: Oct. 19, 2004

(87) PCT Pub. No.: WO03/093083

PCT Pub. Date: Nov. 13, 2003

(65) Prior Publication Data

US 2005/0178991 A1 Aug. 18, 2005

(30) Foreign Application Priority Data

May 2, 2002 (DE) .............................. 102 19 672
Nov. 21, 2002 (DE) .............................. 102 54 342

(51) Int. Cl.
F16K 43/00 (2006.01)
F16K 31/02 (2006.01)

(52) U.S. Cl. .............................. 137/15.18; 251/129.18
(58) Field of Classification Search ........... 251/129.01, 251/129.15, 129.19, 129.18, 337; 137/315.03, 137/15.18; 335/274

See application file for complete search history.

(56) References Cited

U.S. PATENT DOCUMENTS

| 2,574,762 | A | * | 11/1951 | Schell ..................... 335/245 |
| 2,612,188 | A | * | 9/1952 | Persons ................. 251/129.15 |
| 4,453,700 | A | * | 6/1984 | Otsuki et al. .......... 251/129.15 |
| 4,712,767 | A | * | 12/1987 | Losser et al. .......... 251/129.14 |
| 4,765,587 | A | * | 8/1988 | Cummins .............. 251/129.19 |
| 5,167,442 | A |   | 12/1992 | Alaze et al. |
| 5,261,610 | A | * | 11/1993 | Waryu et al. ............ 239/585.4 |
| 5,496,100 | A | * | 3/1996 | Schmid ................... 303/119.2 |
| 5,711,583 | A | * | 1/1998 | Bareiss et al. ........... 303/119.2 |

(Continued)

FOREIGN PATENT DOCUMENTS

| DE | 43 09 739 C2 | 9/1994 |
| DE | 197 16 856 A1 | 10/1998 |
| DE | 198 05 404 A1 | 8/1999 |

(Continued)

OTHER PUBLICATIONS

International Search Report of Application Serial No. PCT/EP03/04422 dated Jul. 29, 2003.
German Search Report of Application No. 102 54 342.9 dated May 21, 2003.

Primary Examiner—Eric Keasel
Assistant Examiner—Andrew J. Rost
(74) Attorney, Agent, or Firm—RatnerPrestia

(57) ABSTRACT

The present invention relates to a solenoid valve. The end of valve, which points away from the magnet core towards the magnet armature, bears against an area of a valve tappet remote from the valve seat. The valve tappet is positioned so that it can be displaced in a bore of the magnet armature in order to adjust the preloading force of the spring.

1 Claim, 2 Drawing Sheets

U.S. PATENT DOCUMENTS

| | | | |
|---|---|---|---|
| 5,810,330 A * | 9/1998 | Eith et al. | 251/129.19 |
| 6,062,531 A * | 5/2000 | Rapp et al. | 251/50 |
| 6,619,617 B2 * | 9/2003 | Ricco et al. | 251/129.16 |
| 6,679,475 B2 * | 1/2004 | Rembold et al. | 251/129.14 |
| 6,994,406 B1 * | 2/2006 | Krawczyk et al. | 303/119.2 |

FOREIGN PATENT DOCUMENTS

| | | |
|---|---|---|
| DE | 198 26 578 A1 | 12/1999 |
| DE | 101 09 178 A1 | 9/2001 |
| DE | 100 64 169 A1 | 2/2002 |

* cited by examiner

SOLENOID VALVE

TECHNICAL FIELD

The present invention relates to a solenoid valve, in particular for motor vehicle wheel slip control systems.

BACKGROUND OF THE INVENTION

DE 198 05 404 A1 discloses a solenoid valve of the generic type whose spring interposed between the magnet armature and the magnet core must exhibit an exact preloading force in order that the valve tappet can execute the desired opening characteristics. The preloading force of the spring is influenced not only by the precision of the manufacture of springs but also by the variations in dimension of the individual valve parts such as magnet armature and magnet core. In particular the variations in dimension with respect to the bore accommodating the spring in the magnet armature and the adjusted stroke of the magnet armature and the actual preloading force of the spring at a defined measuring length make it complicated to precisely maintain the desired preloading force of the spring.

Therefore, a object of the invention is to improve a solenoid valve of the generic type, while maintaining a simplest possible design, in such a fashion that the preloading force of the spring can be exactly adjusted in a simple manner irrespective of the mentioned imponderables.

SUMMARY OF THE INVENTION

The drawbacks associated with known solenoid valves are resolved to a large degree by a solenoid valve in accordance with the present invention. In one embodiment of the invention, a solenoid valve for motor vehicle wheel slip control systems includes a valve housing furnished with pressure fluid channels in which a valve tappet is movable guided. The valve tappet is directed with its valve closure member to a valve seat. A magnet armature is fitted to the valve tappet and performs as stroke movement on a magnet core arranged in the valve housing in dependence on the electromagnetic energization of a valve coil secured to the valve housing. A spring positions, in the electromagnetically non-energized valve position, the magnet armature at a defined axial distance from the magnet core in such a fashion that the magnet armature is separated from the magnet core by a space, to what end the spring is supported with one end on the magnet core, wherein the other end of the spring abuts on an area of the valve tappet remote from the valve set. The valve tappet is arranged in a bore of the magnet armature so as to be adjustable for the variation of the preloading force of the spring.

DETAILED DESCRIPTION OF THE PREFERRED EMBODIMENTS

Figure 1:
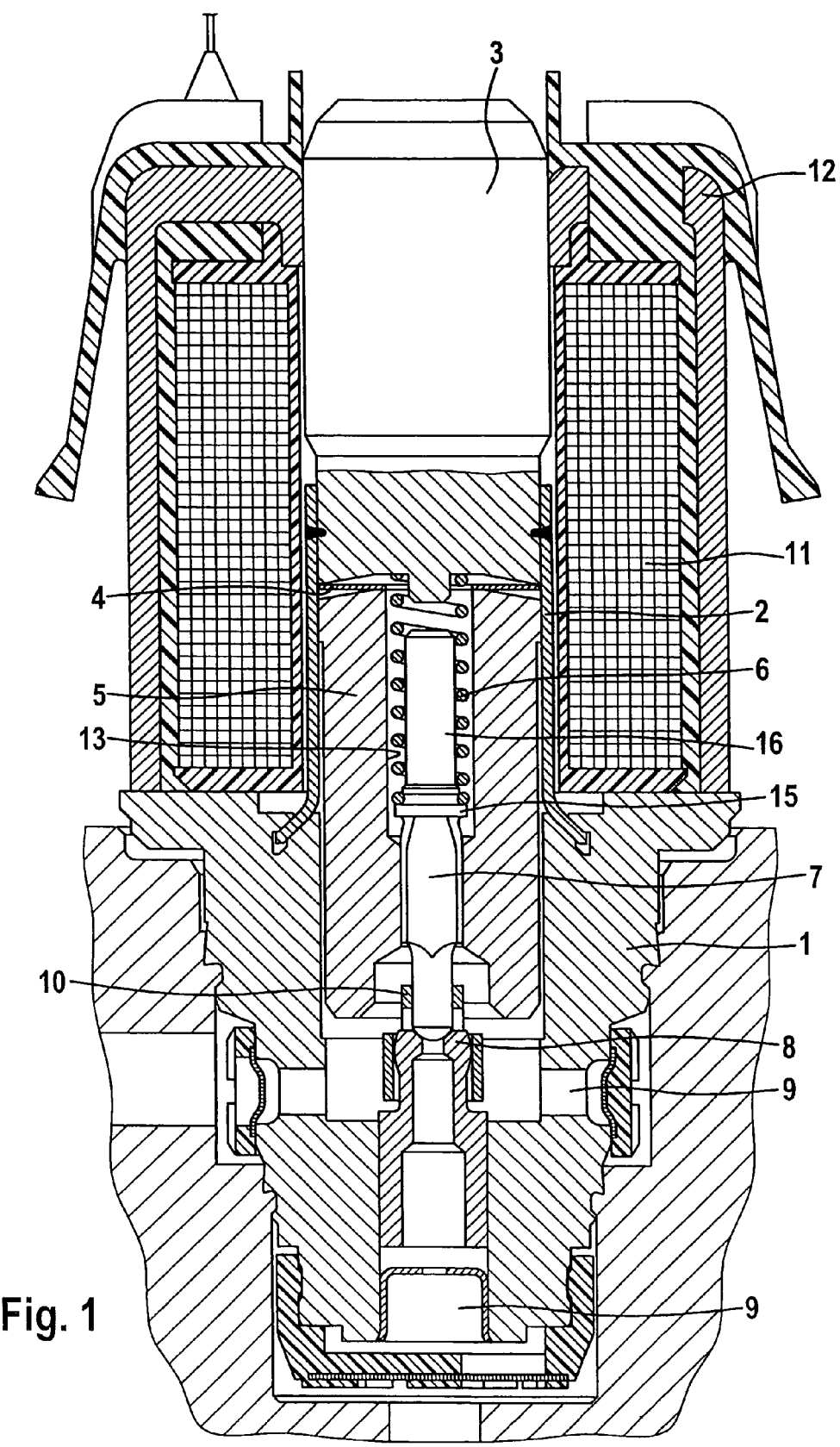
FIG. 1 is a longitudinal cross-section taken through a solenoid valve that is closed in its non-energized basic position.

FIG. 1 shows a solenoid valve that is closed in its non-energized basic position and whose valve housing 1 exemplarily has a cartridge-type construction. The midportion of valve housing 1 is configured as a thin-walled valve sleeve 2, which is seal-tightly closed by means of a plug-shaped magnet core 3.

When desired or required, the valve sleeve 2 can be closed like a dome, what is in contrast to FIG. 1, so that then the cylindrical magnet core 3 is secured in the dome area without a sealing function.

For the purpose of analog operation of the solenoid valve, an annular-disc shaped spring element 4 is disposed below the magnet core 3 in the present example and bears loosely against the outside edge of the concavely shaped end surface of the piston-shaped magnet armature 5. In consideration of the magnet armature stroke, the thickness of the spring element 4 corresponds to the necessary dimensions of the residual air slot of the magnet armature so that in the electromagnetically non-energized valve switching position according to the drawings, the spring element 4 has an axial distance from the convexly shaped end surface of the magnet core 3.

The magnet armature 5 accommodates within a stepped bore 13 a per se known spring 6 which, in its capacity as a compression spring, extends with its one coil end through the opening in the spring element 4 towards the end surface of the magnet core 3. Consequently, the magnet armature 5 is urged, under the effect of spring 6, at the opposed magnet armature end surface, with the valve tappet 7 against a valve seat 8 in the valve housing 1, with the result that a pressure fluid channel 9 that extends through the valve housing 1 in horizontal and vertical directions is interrupted in the electromagnetically non-energized valve position. The valve tappet 7 is fixed by means of a press fit in the stepped bore 13 of the magnet armature 5 and centered at its end portion facing the valve seat 8 in a guiding sleeve 10.

The magnetic circuit can be closed by energizing a valve coil 11 fitted to the valve housing 1 and a yoke ring 12 enclosing a valve coil 11 so that the magnet armature 5 moves in the direction of the magnet core 3. The result is that the interposed spring element 4 is elastically deformed and moves to bear against the magnet core 3 where it abuts with its full surface on the inclined end surfaces of the magnet core 3 and the magnet armature 5 when the maximum tappet stroke is completed. The magnet armature 5 is automatically slowed down due a resilient force of spring element 4 that is opposed to the movement of the magnet armature 5, before it can urge the spring element 4 against the end surface of the magnet core 3, thereby diminishing the switching noise of the solenoid.

Designing the spring element 4 as a particularly flat spring washer or as a cup spring advantageously results also in a progressive spring characteristic curve which, in addition to the actual design of the solenoid valve as a two-position valve, permits a functional extension of a two-position valve as a solenoid valve of analog or proportional operation which is surprisingly simple especially in terms of control technique. The progressive spring element 4 quasi effects a linearization of the magnet armature force.

Upon termination of the electromagnetic energization, the preloading force of the spring element 4 additionally brings about a quickest possible resetting of the magnet armature 5 out of the end position at the magnet core 3 because the so-called sticking of the magnet armature on the magnet core, which is normally caused by remanence, is omitted due to the resetting tendency of the spring element 4.

Irrespective of the embodiment and mode of operation of the above-mentioned solenoid valve chosen, be it as a valve of digital operation (either with or without the spring element 4) or a valve of analog operation, the invention provides that the end of spring 6 remote from the magnet core 3 abuts directly on an area of the valve tappet 7 that is remote from the valve seat 8 and arranged so as to be axially displaceable in the stepped bore 13 of the magnet armature 5 in order to adjust the preloading force of the spring 6. The adjustment or displacement of the valve tappet 7 in the bore 13 takes place by means of a frictional connection between the valve tappet 7 and the magnet armature 5. To this end, the valve tappet 7 has a many-sided profile, in particular a triangular profile, in the contact area with the bore 13, and a free space is maintained between the peripheral surface of the many-sided profile and the bore 13 in the magnet armature 5 having the shape of pressure compensating channels 14 that are sufficiently generously sized and distributed evenly over the periphery of the valve tappet 7. Said compensating channels permit a hydraulic pressure balance on either side of the magnet armature 5. In addition to the provision of the compensating channels 14, using a many-sided profile for the press-fit area of the valve tappet 7 in the bore 13 is advantageous inasmuch as the displacing force necessary for adjusting the spring force depends only slightly on the tolerance-afflicted dimension of press fit of the valve tappet 7 in the bore 13. Further, only little abrasion that can be easily removed in any case is caused during the press fit operation in the bore 13. Therefore, a line contact between the bore wall and the valve tappet 7 is principally highly advantageous for the desired press fit connection.

Outside the contact area with the bore 13 in the direction of spring 6, the valve tappet 7 includes a disc-shaped step 15 on which the end of spring 6 remote from the magnet core 3 is supported,. A guiding pin 16, which extends into spring 6 configured as a helical spring, succeeds the step 15 in the direction of the magnet core 3. To be able to support the spring 6 in a radial direction, thereby preventing lateral buckling of the spring 6, the diameter of the guiding pin 16 is chosen to be only slightly smaller than the inside diameter of the spring 6 configured as a helical spring. Guiding the spring 6 on the guiding pin 16 rather than in the bore 13 is advantageous in terms of manufacturing technique in that it is easier to finish the guiding pin 16 than the bore wall, when required.

Between the step 15 and the guiding pin 16 a transition area 17 is provided for the operative and/or positive attachment of the end of spring 6 facing the valve tappet 7. The transition area 17 is formed of an annular groove in which the one end of spring 6 snaps. The spring 6 associated with the valve tappet 7 is held captive thereby. It forms along with the valve tappet 7 inserted into the magnet armature 5 a pre-assembled and already exactly adjusted subassembly 18, the adjustment of which will be explained in the following by way of FIG. 2.

Figure 2:
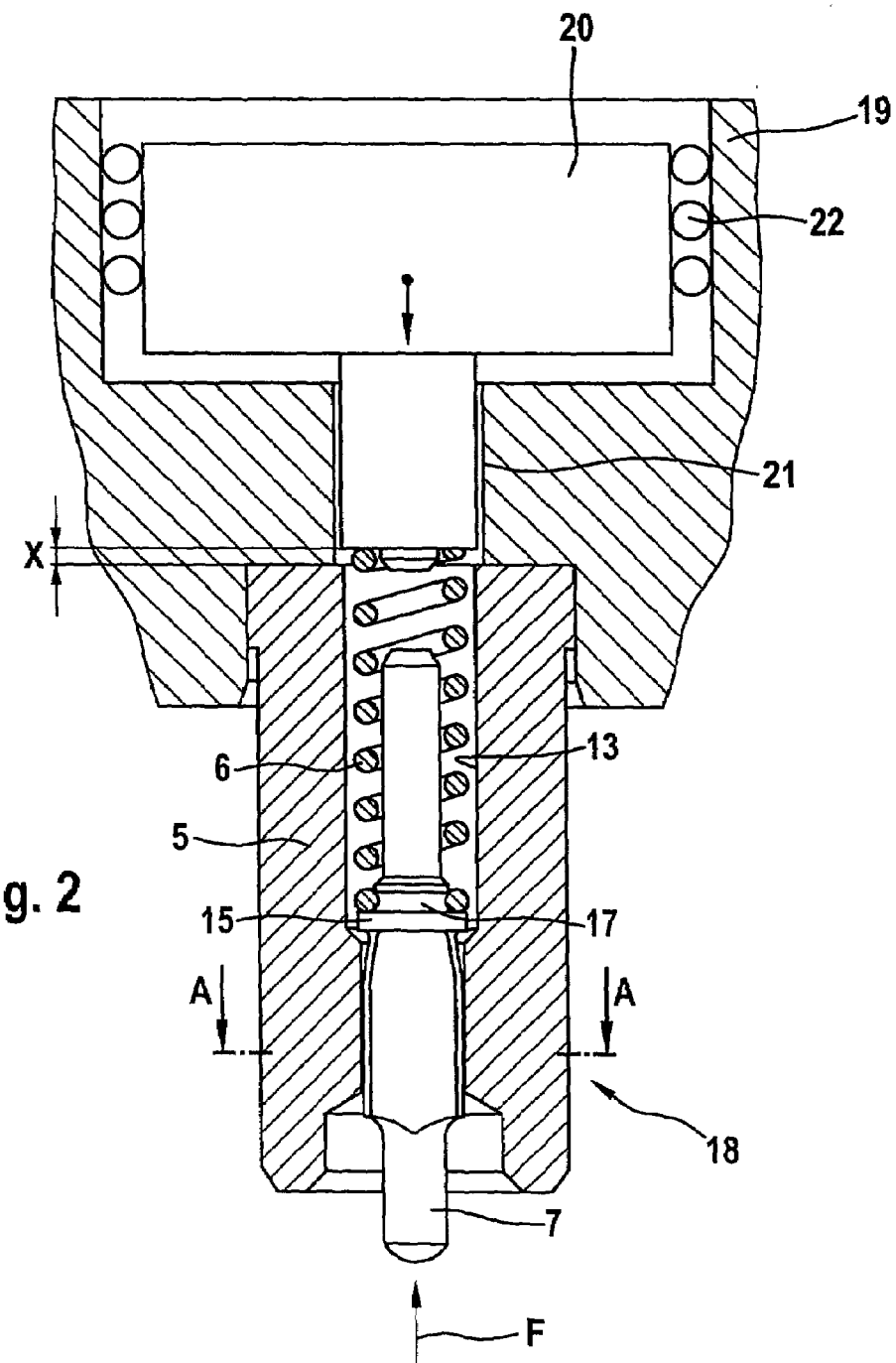
FIG. 2 is an enlarged view of the details of the solenoid valve illustrated in FIG. 1, which are essential for the invention and arranged within an adjusting device.

A considerably enlarged view in FIG. 2 shows the subassembly 18 described hereinabove, onto which subassembly a block-shaped device 19 is seated in order to simply and nevertheless exactly adjust the preloading force of spring 6. A weight 20 that is guided in a low-friction manner by way of a roller bearing 22 projects from above into a stepped bore 21 in device 19 under the effect of gravity. The subassembly 18 comprising the magnet armature 5, the valve tappet 7, and the spring 6 is disposed concentrically to the stepped bore 21 and abuts at the bottom on device 19. To adjust the preloading force of spring 6, the end surface of the magnet armature 5 that is remote from the valve closure member is supported on the end surface of device 19 remote from the piston-shaped weight 20. The spring 6 pre-assembled at the valve tappet 7 projects with its end remote from the valve tappet 7 beyond the magnet armature 5 and is supported within the stepped bore 21 on the bottom end surface of the weight 20 that is guided in the stepped bore 21.

In the arrangement described, a displacing force F acts from below onto the valve tappet 7 for adjusting the spring force, said displacing force F displacing the valve tappet 7 in the bore 13 of the magnet armature 5 in the direction of the spring 6 loaded by the weight 20 and namely until the weight 20 has performed the stroke in the device 19 according to the drawing, said stroke corresponding to the operational clearance X of the magnet armature 5 in the solenoid valve. Said stroke is preferably measured in a non-contact manner by means of appropriate measuring sensor equipment.

The preloading force F of spring 6 to be adjusted thus corresponds to the weight 20, which is applied to the end of spring 6 remote from the valve tappet 7. Caused by the adjustment of the spring force described, the variations in dimension of the magnet armature 5 and the spring force depending on the measuring length of the spring 6 no longer need to be taken into consideration when adjusting the preloading force F of spring 6.

Figure 3:
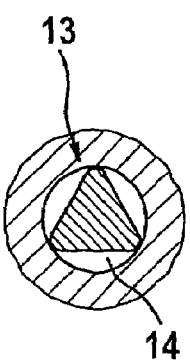
FIG. 3 is a cross-section taken through the valve tappet known from FIGS. 1 and 2 in the area of its jointing portion within the bore of the magnet armature.

FIG. 3 illustrates the cross-section of the valve tappet 7 in the area of bore 13 along the line A—A (cf. FIG. 2). The cross-section of the valve tappet 7 is configured as a triangular profile, the edges of which are at least deburred and rounded off, if possible, in order to avoid surface damages. Thus, the three generously dimensioned compensating channels 14 remain between the three lateral surfaces of the triangular profile and the bore 13, said channels ensuring a low-resistant fluid penetration and hydraulic application of the magnet armature 5 as uniformly as possible.

The invention claimed is:

1. A method of adjusting a preloading force of a spring in a solenoid valve, said method comprising the steps of:
    interconnecting a valve tappet, a magnet armature and a compression spring to form a subassembly to be incorporated into the solenoid valve;
    connecting a device onto the subassembly with a bottom portion of the device seated on an end of the magnet armature, the device having a stepped bore into which an end of the compression spring projects;
    guiding a weight in the stepped bore under the influence of gravity until a bottom surface of the weight contacts the end of the compression spring that projects in the stepped bore; and
    applying a displacing force to the valve tappet to displace the valve tappet relative to the armature, the displacing force being selected to displace the weight by a predetermined stroke distance corresponding to an operational clearance to be maintained after the subassembly is incorporated into a solenoid valve.

* * * * *